(12) United States Patent
Bohnet et al.

(10) Patent No.: US 8,714,896 B2
(45) Date of Patent: May 6, 2014

(54) FIXING ELEMENT

(75) Inventors: Hartmut Bohnet, Waldachtal (DE); Jochen Kaupp, Waldachtal (DE); Roland Unterweger, Pfalzgrafenweiler (DE); Mathias Haag, Haiterbach (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 0 days.

(21) Appl. No.: 13/992,484

(22) PCT Filed: Jan. 12, 2012

(86) PCT No.: PCT/EP2012/000114
§ 371 (c)(1),
(2), (4) Date: Jun. 7, 2013

(87) PCT Pub. No.: WO2012/100911
PCT Pub. Date: Aug. 2, 2012

(65) Prior Publication Data
US 2013/0259594 A1 Oct. 3, 2013

(30) Foreign Application Priority Data
Jan. 24, 2011 (DE) .......................... 10 2011 000 285

(51) Int. Cl.
*F16B 13/04* (2006.01)
(52) U.S. Cl.
USPC ............................................ 411/21; 411/55
(58) Field of Classification Search
CPC .......... F16B 13/02; F16B 13/06; F16B 13/12; A47K 13/26
USPC ........ 411/18, 20, 30, 32, 44, 54, 55, 57.1, 59, 411/60.2, 63, 78, 80.1, 80.2, 80.5, 80.6, 21
See application file for complete search history.

(56) References Cited

U.S. PATENT DOCUMENTS 3,269,251 A * 8/1966 Bass ............................... 411/21
3,476,164 A 11/1969 Voullaire
(Continued)

FOREIGN PATENT DOCUMENTS

| DE | 560 389 A | 10/1932 |
| DE | 40 11 229 A1 | 8/1991 |
| EP | 1 491 775 A1 | 12/2004 |

OTHER PUBLICATIONS

International Preliminary Report on Patentability for corresponding International Application No. PCT/EP2012/000114 dated Jul. 30, 2013.

(Continued)

*Primary Examiner* — Roberta Delisle
(74) *Attorney, Agent, or Firm* — Renner, Otto, Boisselle & Sklar, LLP

(57) ABSTRACT

The invention relates to a fixing element (1) for anchoring in a drilled hole, having a shank portion (2) and an expansion element (3), there being arranged on the shank portion (2) an expander body (8) for expanding the expansion element (3). The expansion element (3) has a plurality of arcuate expansion lobes (11), each expansion lobe (11) being formed by two bridging portions (14) connected by a yoke (15). The bridging portions (14) of the expansion lobes (11) together generate an envelope surface (M) of the expansion element (3), which envelope surface (M) has rotational symmetry about the longitudinal axis (A) of the fixing element (1). In order to provide a fixing element (1) which can be used both in a wide and also in a narrow drilled hole, the invention proposes that the yoke (15) have an arcuate curvature (17) which projects beyond the envelope surface (M) in the radial direction (R).

8 Claims, 2 Drawing Sheets

(56) References Cited

U.S. PATENT DOCUMENTS

| | | | |
|---|---|---|---|
| 3,938,420 A | | 2/1976 | Draa |
| 4,195,547 A | * | 4/1980 | Giannuzzi ........................ 411/54 |
| 4,501,520 A | * | 2/1985 | Bergner .......................... 411/21 |
| 5,176,481 A | * | 1/1993 | Schiefer ....................... 411/60.1 |
| 5,263,803 A | * | 11/1993 | Anquetin ........................ 411/31 |
| 6,309,155 B1 | * | 10/2001 | Huang ............................ 411/61 |
| 6,524,046 B2 | * | 2/2003 | Hsu ................................ 411/61 |
| 6,827,535 B2 | * | 12/2004 | Fuchs et al. .................... 411/44 |
| 6,866,455 B2 | * | 3/2005 | Hasler ............................ 411/21 |
| 7,344,346 B2 | * | 3/2008 | Hsu .............................. 411/551 |
| D663,613 S | * | 7/2012 | Bohnet et al. ................. D8/387 |
| 2009/0257842 A1 | * | 10/2009 | Lo ................................. 411/44 |
| 2012/0042502 A1 | * | 2/2012 | Wenfeng et al. ........... 29/525.04 |

OTHER PUBLICATIONS

International Search Report for corresponding International Application No. PCT/EP2012/000114 mailed Apr. 5, 2012.

German Search Report for related German Application No. 10 2011 000 286.3 dated Nov. 16, 2011.

* cited by examiner

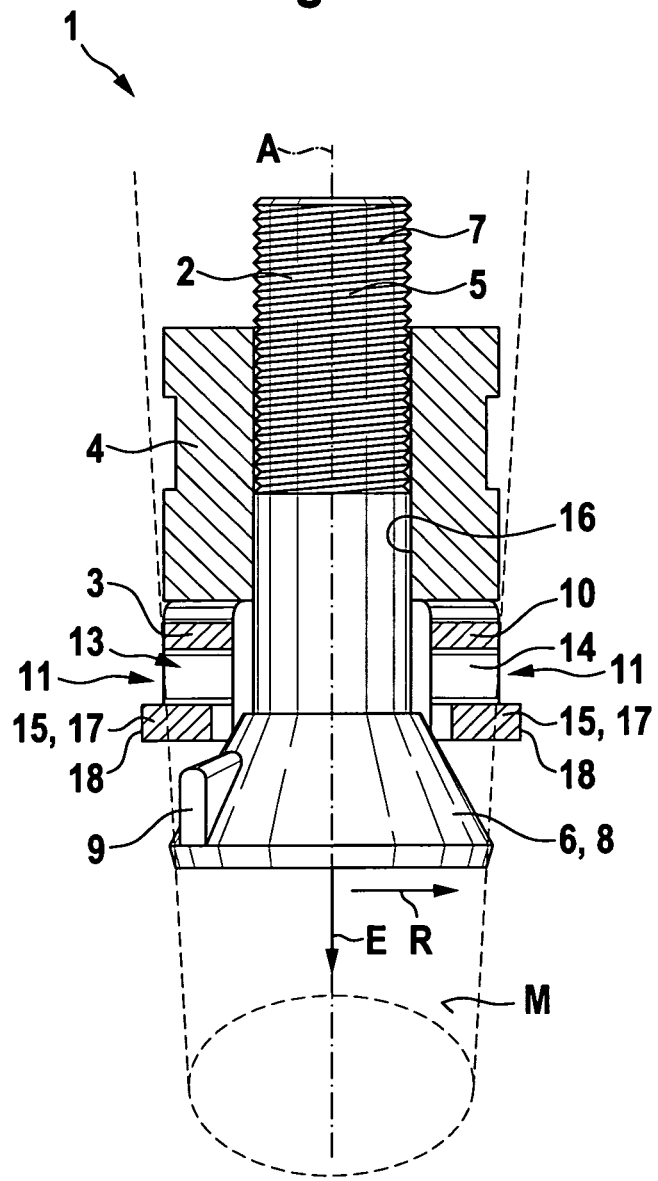

FIXING ELEMENT

TECHNICAL FIELD OF INVENTION

The invention relates to a fixing element having the features of the preamble of claim 1.

DISCUSSION OF RELATED ART

A fixing element of such a kind for anchoring in a drilled hole is known from the Offenlegungsschrift DE 40 11 229 A1. The fixing element shown in that document is suitable especially for fixing panel-like building elements, for example natural stone panels, to a load-supporting structure. The fixing element is in the form of an anchor for an undercut and has a shank portion and an expansion element. On the shank portion, at its front end (the introduction end), there is arranged an expander body which has a diameter that widens out and by means of which the expansion element can be expanded. The shank portion also has, in a rear portion, a load application means. The expansion element consists of a wire ring having arcuate expansion lobes bent forwards, in the direction of the expander body, with two bridging portions connected by a U-shaped yoke at the front end. In the non-expanded state, the U-shaped yoke rests on top of the expander body. Also arranged on the shank portion of the fixing element is an expansion sleeve. When the expansion sleeve is moved in the axial direction along the shank portion in the direction of the conical expander body, the expansion sleeve presses the expansion element up onto the expander body, which widens out in the direction of introduction, as a result of which the expansion lobes are so expanded that they occupy, at least partially, the undercut in the drilled hole. As a result of the expansion of the expansion lobes, the fixing element is anchored in the drilled hole by means of a shape-based fit.

In order to produce the drilled hole, a drilling tool is used which, depending on the degree of wear, produces a relatively wide or narrow drilled hole. In the case of a relatively wide drilled hole it can happen, in the case of the known fixing element, that the expansion element does not completely bridge the space between the expander body and the wall of the drilled hole, so that the fixing element is not securely seated in the drilled hole.

SUMMARY OF THE INVENTION

The problem for the invention is therefore to provide a fixing element for which tolerances of the drilling tool are not critical.

The problem is solved, in accordance with the invention, by a fixing element having the features of claim 1. The fixing element according to the invention for anchoring in a drilled hole comprises a shank portion and an expansion element. On the shank portion there is arranged an expander body for expansion of the expansion element. The shank portion is especially in the form of a conical bolt, having a conical expander body, especially of a truncated cone kind, which widens out in the direction of introduction and which is arranged on the front end of the shank portion at the introduction end. Typically the shank portion also has a load application means, for example a thread. The expansion element is typically of sleeve-shaped construction, "sleeve-shaped" meaning that the expansion element substantially surrounds the shank portion in the circumferential direction. The expansion element especially is a sleeve that is continuous in the circumferential direction. The "direction of introduction" and "introduction end" mean the direction and end, respectively, in which and by means of which the fixing element is introduced into a drilled hole. The expansion element has a plurality of arcuate expansion lobes, each expansion lobe being formed by two bridging portions connected by a yoke. The bridging portions and the yoke of an expansion lobe especially are of thin-walled and/or wire-form construction. The bridging portions of the expansion lobes together generate an envelope surface of the expansion element, which surface has rotational symmetry about the longitudinal axis of the fixing element. In other words, the bridging portions lie on the envelope surface of a body, especially a cylinder or a cone, having rotational symmetry about the longitudinal axis.

The particular formation of the yoke of one or more of the expansion lobes is characteristic of the fixing element according to the invention. In accordance with the invention, the yoke of at least one expansion lobe has a curvature which, in the radial direction, projects beyond the envelope surface. As a result, the radial extent of the yoke is greater than the thickness of the material of the yoke in a radial direction, as a result of which a part of the expansion lobe in the region of the yoke, in the expanded state, projects further into the drilled hole into which the fixing element has been introduced. Accordingly, the expansion lobe can, even in a relatively wide drilled hole, bridge the space between the wall of the drilled hole and the expander body so that the fixing element is securely seated in the drilled hole.

In a preferred embodiment of the fixing element according to the invention, the yoke forms the front end of the expansion lobe. Accordingly, on expansion of the expansion lobe, the yoke is displaced to the furthest extent in the radial direction away from the longitudinal axis of the anchor and is moved the greatest extent in the direction of the wall of the drilled hole. Preferably, the crown of the arcuate curvature is directed radially outwards, away from the expander body. The crown of the curvature is then the first part of the yoke to come to lie against the wall of a drilled hole. Compared to an inward curvature the advantage obtained is that the forces required for expansion are lower. Preference is likewise given to the arcuate curvature extending substantially in the circumferential direction. The curvature especially extends uniaxially and in the form of a bridge in the circumferential direction. When the arcuate curvature extends substantially in the circumferential direction and the crown is directed radially outwards, the curvature acts as a surface roughness element, in the manner of a tooth or rib, in such a way that the friction between the expansion element and the wall of the drilled hole is increased, by engaging behind irregularities in the wall of the drilled hole.

In a further preferred embodiment of the fixing element according to the invention, the curvature in the radial direction acts as a spring by virtue of its geometric formation. If the curvature extends, for example, substantially in the manner of a bridge in one direction, for example in the circumferential direction, the curvature acts as a leaf spring. The curvature in the radial direction acting as a spring has the advantage that the yoke can adapt to the size and shape of the drilled hole on expansion. If the yoke were adapted to the size of a wide drilled hole only by means of a thickening of material or by being formed by stamping in-the-round, the result in a narrow drilled hole would be undesirable additional expansion forces for the fixing element to be completely expanded. As a result of the geometric formation of the curvature as a spring, adaptation is possible with relatively little force. In a narrow hole, the spring is radially compressed without expansion forces of significant magnitude occurring. Especially when the yoke has a small cross-section, for example when it is of wire-like construction, the curvature is relatively resilient and readily deformable so that in the radial direction it acts as a spring even in the case of low forces.

In a further preferred embodiment of the fixing element according to the invention, the expansion lobe is so constructed that the expansion lobe becomes narrower in the direction of its free end. The yoke connecting the bridging portions is especially U-shaped or V-shaped and forms the front end of the expansion lobe at the introduction end. This has the advantage that the expansion lobe can be more readily expanded when it meets the wall of the drilled hole, as a result of which stresses that may be caused by installation of the fixing element in the wall of the drilled hole, especially when the expansion lobe is pressed against the base of the drilled hole, are reduced.

Preference is likewise given to the expansion element of the fixing element according to the invention having, at its rear end in the direction of introduction, a continuous ring-shaped basic body, on which the expansion lobes are arranged at the introduction end. The continuous basic body ensures that the expansion element is not pulled over the expander body even in the event of high loads and that the fixing element is securely anchored.

Preferably, the expansion element of the fixing element according to the invention is a stamped part, especially a stamped and bent part, which is made from metal. This makes it possible for the expansion element and the fixing element according to the invention to be simply and economically manufactured.

The invention will be explained in greater detail hereinbelow with reference to an example of an embodiment shown in the drawings, in which:

BRIEF DESCRIPTION OF THE DRAWINGS

FIG. 2 is a partially cut-away representation of the fixing element.

DETAILED DESCRIPTION OF THE INVENTION

Figure 1:
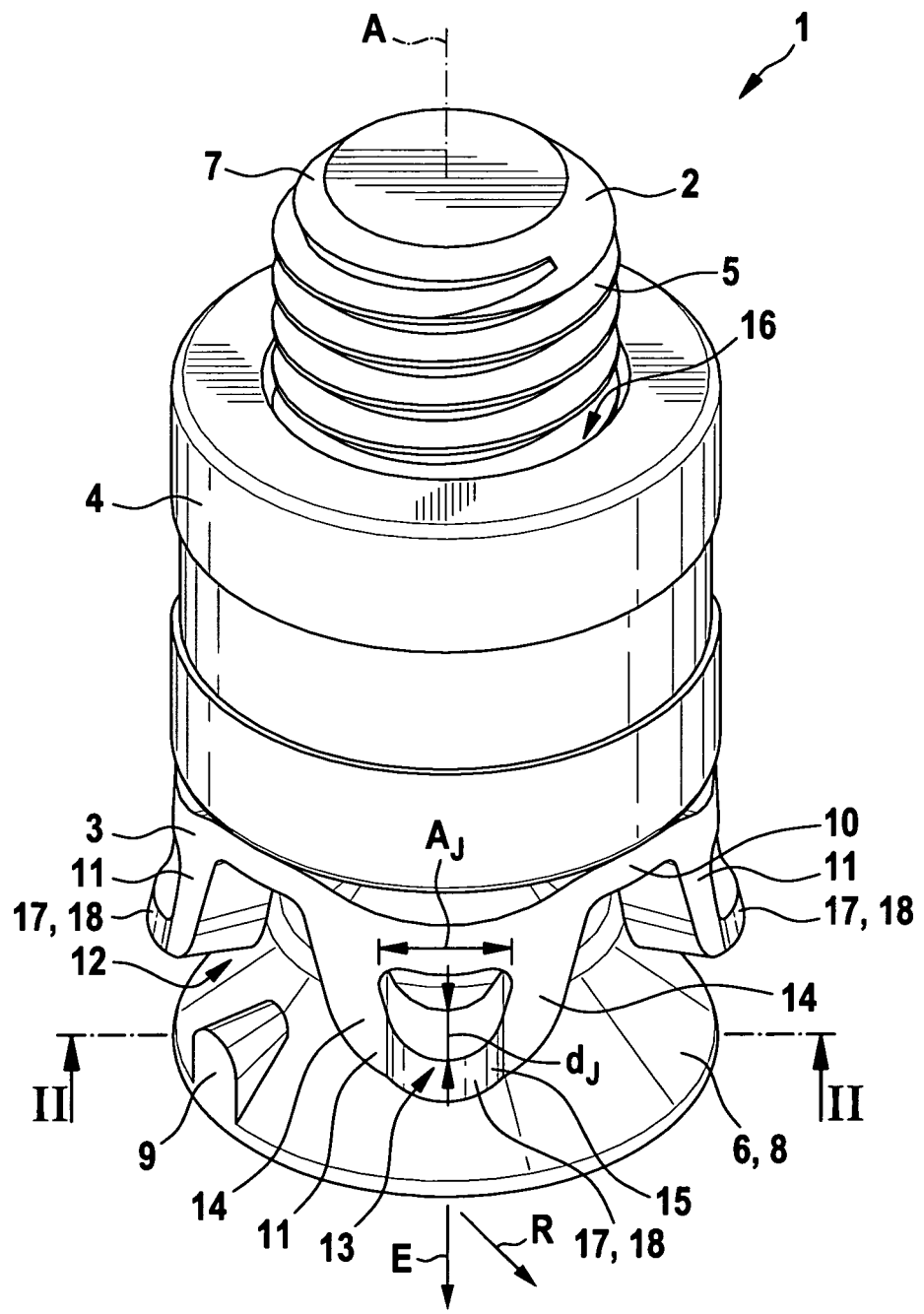
FIG. 1 is a perspective view of a fixing element according to the invention in an unexpanded state.

The Figures show a fixing element 1 according to the invention in an unexpanded state, as introducible in the direction of introduction E into a drilled hole (not shown). The direction of introduction E is parallel to the longitudinal axis A of the fixing element 1. The fixing element 1 is in the form of an anchor for an undercut, for anchoring in an undercut drilled hole (not shown). The fixing element 1 consists of a shank portion 2, an expansion element 3 and an expansion sleeve 4.

The shank portion 2 is a conical bolt having a cylindrical portion 5 and a conical portion 6 adjacent thereto at the introduction end, the diameter of which increases in the direction of introduction E. The conical portion 6 forms an expander body 8, which is in the form of a truncated cone and which forms the front end of the shank portion 2. The expander body 8 expands the expansion element 3 when it is pushed up onto the conical portion 6 in the direction of introduction E. The cylindrical portion 5 has a load application means 7 in the form of an external thread. The load application means 7 is used, for example, for fixing the fixing element 1 to a load-supporting structure (also not shown).

At its rear end, the expansion element 3 has a ring-shaped basic body 10, which surrounds the cylindrical portion 5 of the shank portion 2 as a continuous sleeve in the form of a ring. Arranged on the basic body 10, at the introduction end, are four expansion lobes 11, which are spaced apart from one another in the circumferential direction by recesses 12. Each of the expansion lobes 11 has an aperture 13 in the form of a through-hole that is surrounded on all sides, which is arranged approximately centrally in the particular expansion lobe 11. The expansion lobes 11 are accordingly arcuate, with an expansion lobe 11 being formed by two bridging portions 14 and a U-shaped yoke 15, the yoke 15 connecting the two bridging portions 14 to one another. The yoke 15 forms the front end of the expansion lobe 11, which, by virtue of the U-shaped construction of the yoke 15, becomes narrower in the direction of its front end.

The bridging portions 14 of the expansion lobes 11 together generate an envelope surface M of the expansion element 3, which envelope surface M has rotational symmetry about the longitudinal axis A of the fixing element 1 and is conical. In other words, the bridging portions 14 are located on the envelope surface M of a body having rotational symmetry about the longitudinal axis. The yoke 15 has an arcuate curvature 17, which projects beyond the envelope surface M in the radial direction R and extends substantially uniaxially in the circumferential direction. The crown 18 of the curvature 17 faces outwards away from the expander body 8 in the radial direction R. The outwardly projecting curvature 17 acts as a leaf spring in the radial direction, which can compensate for tolerances in the width of the drilled hole. In the region of the curvature 17, the radial extent of the yoke 15 is greater than the material thickness of the yoke 15, so that the crown 18 of the curvature 17 lies against the wall of the drilled hole even in the case of a relatively wide drilled hole. If, on the other hand, the drilled hole is relatively narrow, the leaf-spring-like curvature 17 is compressed in the radial direction so that the expansion element 3 can be pushed over the expander body 8 even in a narrow drilled hole as planned, without undesirably high constraining forces being produced in the material of the wall of the drilled hole. Especially as a result of the wire-like formation of the yoke 15, the curvature can be compressed relatively easily in the radial direction. "Wire-like" means here that the yoke 15 has a cross-section whose dimensions, relative to the extent of the yoke 15 in the circumferential direction, are relatively small. In the case of the fixing element 1 according to the invention which is shown in the Figures, the ratio of the extent $A_j$ of the yoke 15 in the circumferential direction to the material thickness $d_j$ of the yoke 15 in the radial direction R is approximately 2.5/1.

The expansion sleeve 4 is in the form of a hollow cylindrical body, the hollow space in the form of a cylindrical bore 16 having an internal diameter which substantially corresponds to the external diameter of the cylindrical portion 5 of the shank portion 2. If the expansion sleeve 4 is displaced in the direction of introduction E by means of an axial force which is, for example, applied by a driving-in device (not shown), the expansion sleeve 4 so presses the expansion element 3 up onto the expander body 8 that the expansion lobes 11 are expanded in the radial direction R.

The fixing element 1 has an anti-rotation arrangement in order that, in the case of a fixing element 1 that has been inserted into a drilled hole and expanded, a nut (not shown) can be screwed onto the load attachment means 7 in the form of an external thread without the fixing element 1 also turning in the drilled hole. A nose-like prominence 9 on the conical portion 6 of the expander body 8 serves as the first part of the anti-rotation arrangement. Further parts of the anti-rotation arrangement are formed by the recess 12 and an expansion lobe 11, against which the nose-like prominence 9 lies in a an expanded state (not shown). A torque applied by a nut is transferred, by the anti-rotation arrangement, to the wall of the drilled hole (not shown) by means of a friction-based connection by way of the expanded expansion element 3. Because the expansion element 3 of the fixing element 1 according to the invention lies firmly against the wall of the drilled hole because of the curvature 17, the fixing element 1 is reliably prevented from also turning in the drilled hole.

The expansion element 3 of the fixing element 1 is made from metal in the form of a stamped and bent part. The shank portion 2 is likewise made of metal and is economically produced by means of cold working. The expansion sleeve 4, on the other hand, is made of a fibre-reinforced plastics material and is made by injection moulding. The fixing element according to the invention is economical to manufacture and, by virtue of its formation, is effective and simple to install.

LIST OF REFERENCE NUMERALS AND LETTERS

1 fixing element
2 shank portion
3 expansion element
4 expansion sleeve
5 cylindrical portion
6 conical portion
7 load attachment means
8 expander body
9 nose-like prominence
10 basic body
11 expansion lobe
12 recess
13 aperture
14 bridging portion
15 yoke
16 bore
17 curvature
18 crown of curvature 17
E direction of introduction
A longitudinal axis
R radial direction
$A_J$ extent of yoke 15 in circumferential direction
$d_J$ material thickness of yoke 15 in radial direction R
M envelope surface

The invention claimed is:

1. A fixing element for anchoring in a drilled hole,
having a shank portion and an expansion element,
there being arranged on the shank portion an expander body for expanding the expansion element,
the expansion element having a plurality of arcuate expansion lobes,
each expansion lobe being formed by two bridging portions connected by a yoke,
the bridging portions of the expansion lobes together generating an envelope surface (M) of the expansion element, which envelope surface (M) has rotational symmetry about the longitudinal axis (A) of the fixing element, wherein
the yoke of at least one expansion lobe has an arcuate curvature, which projects beyond the envelope surface (M) in the radial direction (R).

2. The fixing element according to claim 1, wherein the yoke forms the front end of the expansion lobe.

3. The fixing element according to claim 1, wherein the crown of the arcuate curvature faces radially outwards, away from the expander body.

4. The fixing element according to claim 1, wherein the arcuate curvature extends substantially in the circumferential direction.

5. The fixing element according to claim 1, wherein the arcuate curvature acts as a spring in the radial direction (R).

6. The fixing element according to claim 1, wherein the expansion lobe becomes narrower towards its front end.

7. The fixing element according to claim 1, wherein the expansion element has, at its rear end in the direction of introduction (E), a continuous basic body, on which the expansion lobes are arranged.

8. The fixing element according to claim 1, wherein the expansion element is a stamped part, especially a stamped and bent part.

* * * * *